July 30, 1968    C. F. IRVIN    3,394,908
RESILIENT MOUNTING RING FOR ROTATING MACHINES
Filed Feb. 24, 1967    2 Sheets-Sheet 1

WITNESSES:
Leon M. Garman
E. Strickland

INVENTOR
Charles F. Irvin
BY
ATTORNEY

July 30, 1968   C. F. IRVIN   3,394,908
RESILIENT MOUNTING RING FOR ROTATING MACHINES
Filed Feb. 24, 1967   2 Sheets-Sheet 2

United States Patent Office 3,394,908
Patented July 30, 1968

3,394,908
RESILIENT MOUNTING RING FOR
ROTATING MACHINES
Charles F. Irvin, Lima, Ohio, assignor to Westinghouse
Electric Corporation, Pittsburgh, Pa., a corporation of
Pennsylvania
Filed Feb. 24, 1967, Ser. No. 618,482
8 Claims. (Cl. 248—26)

ABSTRACT OF THE DISCLOSURE

A resilient mounting ring for dynamoelectric machines in which the ring comprises a one-piece integral structure having inner and outer rings mechanically interconnected by a plurality of resilient support structures. These support structures or beams extend between the ends of the annular space formed by the inner and outer rings or in the axial direction. The radial connection between the inner and outer rings is made indirectly through the beams which span the annular length between the inner and outer rings and are attached to the outer ring at one end and to the inner ring at the other end. Each beam has a radially extending height dimension, a circumferentially extending width dimension and a length dimension between the inner and outer ring connections.

---

Each resilient structure or beam in the embodiment shown has a radially extending height dimension substantially exceeding the circumferentially extending width dimension and a length of substantially U-shape so that the mounting ring is resiliently soft in a torsional or rotational direction and rigid in a radial direction. The selection of height, width and length dimensions may be made to obtain the characteristics desired.

The present invention relates generally to machines having rotating components, and particularly to resilient mounting means for such machines.

In the construction and support of small dynamoelectric machines, it is very desirable, if not essential, that operational noises and vibrations be kept as low as possible. This is especially true for small electric motors intended for domestic and office use, as in washing machines, fans and similar applicances and office equipment. For example, these motors normally include a motor housing supporting a rotor and stator for relative rotation, the housing in turn being supported on a stationary structure, such as a mounting base or the like. One very troublesome source of noise and vibration is the pulsating torques having their origin in the magnitude of the flux generated in a standard 60 cycle alternating current motor which changes 120 times per second. Since there is a reaction in the motor stator and rotor in response to each change in flux magnitude this reaction will ultimately be translated into vibrations of the motor housing. Consequently, for these and other reasons, such as forces originating from the weight of the motor and the load driven by the motor, the mounting connection between the housing and the stationary supporting structure will be subjected to a combination of torsional, axial, and radial stresses. In the past, these stresses, and especially the torsional stress and the radial stress created, in part, by radial shaft loading, have shortened the life and effectiveness of the mounting.

In view of these factors and considerations, there has been a practical difficulty in providing a satisfactory yet relatively inexpensive arrangement which is capable of limiting to an acceptable level the transmission of vibration and noise producing forces from the motor housing to its supporting structure for long periods of time. In addition, further difficulty has been experienced in providing a satisfactory vibration and noise isolating arrangement which is also economical to manufacture, install, and maintain.

Accordingly, it is an object of the present invention to provide an improved one-piece resilient mounting ring for dynamoelectric machines which has adequate rigidity and strength against radial and axial loading yet is resiliently soft in a torsional direction so as to effectively isolate the base and supporting structure of the machine from the pulsating torques developed within the machine during operation.

Another object of the invention is to provide an improved, one-piece molded mounting ring for dynamoelectric machines which does not require secondary support members, such as an outer steel ring, for proper operation.

Yet another object of the invention is to provide a one-piece resilient motor mounting ring which can be economically manufactured from a minimum amount of moldable materials in an economical molding cycle.

Briefly, these and other objects of the invention are accomplished by use of a single piece molded plastic support ring comprising a pair of concentric rings mechanically interconnected by structures having a plurality of U-shaped or folded resilient members lying in planes parallel to the rotational axis of the motor, and in equally spaced apart intervals between the rings. One end of each of the resilient members is attached to the inner ring while the other end is attached to the outer ring. Each of the resilient members has further a height dimension extending in a radial direction substantially in excess of its width or cross sectional dimension extending circumferentially of the mounting ring; and each of the members is molded to have a free length between the supports, greater than the axial length of the rings.

With such a support ring, radial deflection varies inversely as the cube of the height, inversely as the width and directly as the cube of the length when load is applied radially between the inner and outer rings. Torsional deflection varies inversely as the height, inversely as the cube of the width and directly as the cube of the length when torsional load is applied between the inner and outer rings.

Thus, with such a structure the mounting ring of the present invention will deflect torsionally yet maintain radial rigidity. The precise relationship between the two may be changed by adjustments in the height, width and length of the resilient members and the number of members used.

The objects and advantages of the invention will become more apparent upon consideration of the following detailed description along with the accompanying drawing in which.

Figure 1:
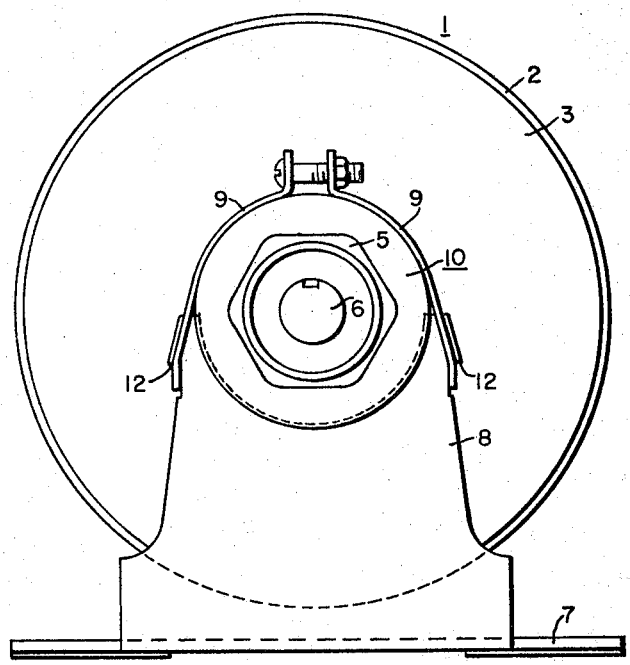
FIGURE 1 is an end elevation view of a dynamoelectric machine incorporating the resilient mounting ring of the invention.

Specifically, there is shown in FIG. 1 a rotating machine 1, for example, a fractional horsepower motor, having a frame 2 secured to an end shield member or end bell portion 3 to form the housing for the machine. The end bell portion 3 includes a hexagon shape hub member 5 which internally supports a bearing sleeve and lubricating arrangement (not shown). The sleeve and lubricating arrangement in turn support a shaft 6 in rotating relationship to the housing and a mounting base 7 having two upright portions 8 at opposite ends, only one of which is shown.

The motor 1 is resiliently secured to the upright portions 8 by two clamping means 9 partially enclosing a resilient mounting ring 10 of the present invention, which is disposed on the hub member 5, the clamping means 9 being suitably secured to the upright portions 8. In FIG. 1, the edges of the upright portions are provided with catches or latching portions 12 which occupy a slotted opening (not shown) provided in the lower portion of each of the clamps 9 when they are disposed in engaging relationship with the latching portions. A conventional nut and bolt means is provided to secure and tighten the clamps 9 about the novel resilient ring 10 as shown in FIG. 1.

The mounting base 7, and the apparatus to which it is attached, is effectively isolated from the magnetic forces and vibration developed within the machine 1 by the novel ring 10 in a manner presently to be explained.

Figure 2:
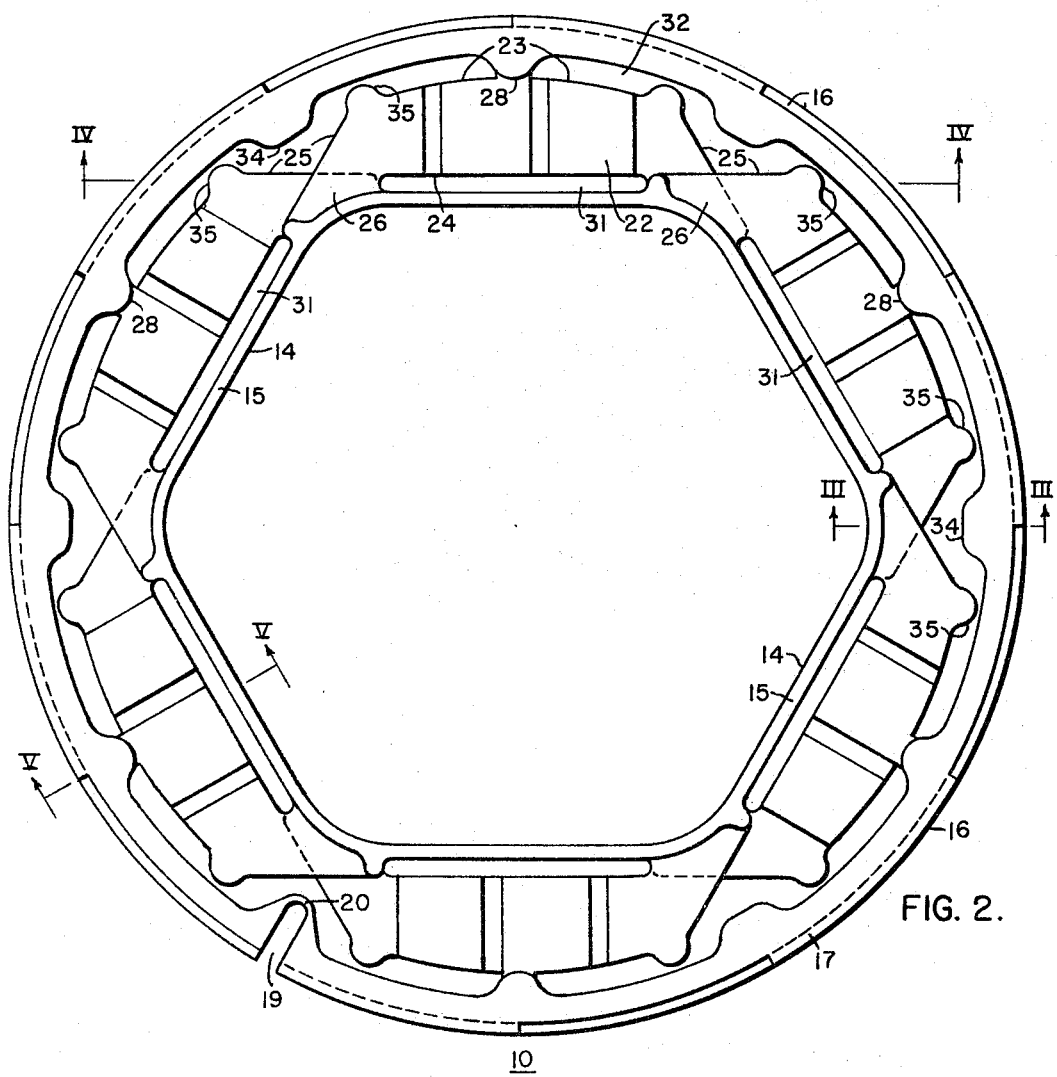
FIG. 2 is an enlarged end elevation view of the resilient mounting ring constructed in accordance with the principles of the invention.

The novel ring 10 is best shown in FIG. 2, and includes an inner ring 14 having straight wall portions 15 which cooperate to form a hexagon configuration like that of the machine hub member 5 so that the ring may be easily placed therein. The ring 10 comprises further an outer circular ring 16, the outside surface of which is provided with a plurality of elongated, interrupted raised portions 17 (FIG. 3) which provide a confining groove 18 for mounting purposes while simultaneously permitting the use of a normal die opening in the molding process to meet the molding requirements.

An adjusting gap 19 may be provided in the outer ring 16, as shown in FIG. 2, the outside diameter of the ring being maintained in alignment by a hinge portion 20 provided at the inner end of the gap. The gap allows the outer ring 16 to yield in a circumferential direction when the clamps 9 are properly tightened to secure motor 1 as explained above.

Figure 4:
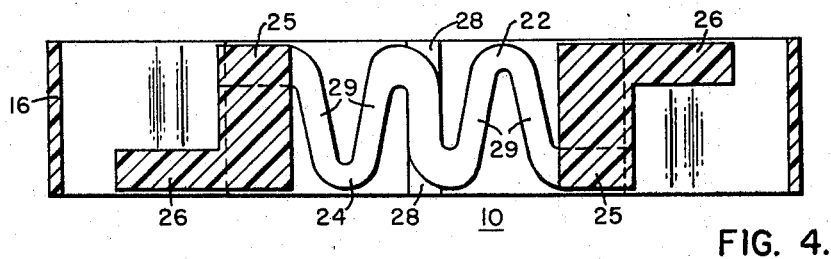
FIG. 4 is a cross sectional view taken along the line IV—IV in FIG. 2.

The inner and outer rings are mechanically coupled together by a plurality of U-shaped or folded resilient members, generally designated 22, having an outer edge portion 23 facing the outer ring 16 and an inner edge portion 24 facing the inner ring 14. These edge portions define the radial height dimension. The resilient members have a folded configuration which extends sinuously and laterally or torsionally between the rings, and a width dimension in the lateral, cross sectional direction that is substantially smaller than the height dimension. The members 22 thus form beam structures that are rigid in a radial direction while laterally or torsionally the beams are soft and resilient. An end elevation view of the resilient member is shown in FIG. 4.

The inner ring end portion of each of the resilient members 22 is attached to the inner ring 14 by sloping lateral extensions 25 formed at the lateral extremity of the members 22, the extensions 25 having a wide base portion 26 at the location of attachment to the inner ring. The wide portion 26 forms an integral part of the inner ring 14 at each junction of two of the straight wall portions 15 as best seen in FIG. 2.

Figure 5:
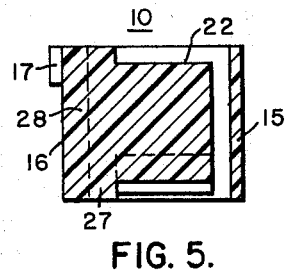
FIG. 5 is a cross sectional view taken along the line V—V in FIG. 2.

Each of the members 22 is further integrally and intermediately attached to the inner surface of the outer ring 16 by an inwardly extending and integral projection 28 provided on the inside surface of the outer ring and disposed axially of the ring 16. Elevation views of the projections 28 are shown in FIGS. 2 and 4 while a cross sectional view of the integral projections is shown in FIG. 5.

Between the attached portions 25 and 28, of the resilient members 22, are intermediate folded or U-shaped portions 29 which remain free of the inner and outer rings. The inner edge portions 24 of the members 22 thus form a plurality of elongated openings or spaces 31 with the straight wall portions 15 which extend about the inner inner 14 as best seen in FIG. 2. The outer edge portions 23 of the members 22 similarly form a space 32 with the outer ring 16 that extends about the rings, the space 32 being interrupted only by the member 22 attachments at the projections 28.

Thus, the resilient members 22 structurally connect the rings 14 and 16 together in such a manner that when the inner ring 14 is subjected to torsional vibrations, such as when the novel rings 10 are disposed on the hub portions of an operating motor, the vibrations are isolated by the torsional deflection of the resilient members thereby reducing the transmission of vibration to the support structure of the motor. The resilient members, however, are rigid in a radial direction because of their height dimension, as explained above, thereby avoiding the need of secondary support members such as a steel ring disposed about the outer ring 16.

Figure 3:
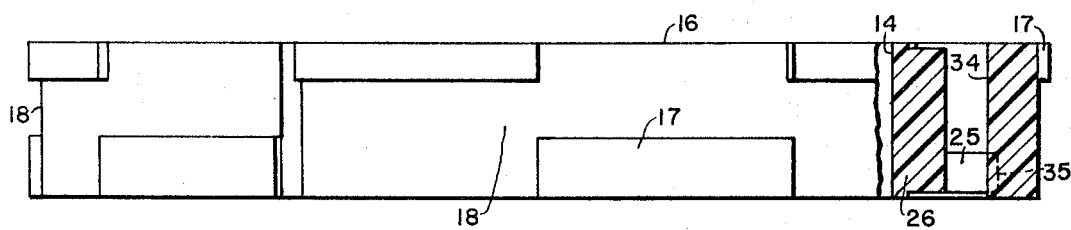
FIG. 3 is a side view of the ring shown in FIG. 2 with a portion thereof shown in cross section taken along line III—III in FIG. 2.

The inside surface of the outer ring 16 is further provided with a plurality of axially extending projections 34 which protrude into the open area between adjacent lateral extensions 25 of the resilient members 22. The lateral extensions 25 are similarly provided with outwardly extending projections 35 disposed adjacent and on opposite sides of the projections 34. The projections 34 and 35 serve as stop means for limiting the amount of torsional ring displacement thereby protecting the resilient members from excessive stress. In FIG. 3, the projection 34 is shown in cross section, and the projection 35 is shown in phantom.

It should now be apparent from the foregoing description that a novel resilient mounting ring has been disclosed for isolating the base and support structure of a rotating machine from torsional vibrations developed within the machine. This is accomplished by a plurality of U-shaped or folded resilient structures disposed between two rings in such a manner that the structures offer a relatively rigid support for the machine in a radial direction yet is resiliently soft in a rotational or torsional direction. The novel mounting ring is further economical to manufacture using a convenient molding cycle with a minimum of material.

Though the invention has been described with a certain degree of particularity, it should be understood that modifications thereof possible without departing from the spirit and scope of the invention. For example, the invention is not limited to a hexagon shaped inner ring 14 and the corresponding number of resilient members 22. The inner ring may have a configuration other than the one shown, and the number of connecting members may, similarly, be other than the number shown. Similarly, the U-shaped configuration of the resilient members is given by way of example and explanation only. Further, the material of the mounting ring 10 may be a plastic, elastomer or other suitable material.

What is claimed is:

1. A single piece integral mounting ring for supporting a rotating machine on a base support structure comprising, spaced apart concentric inner and outer rings forming an annular space between them, a plurality of circumferentially spaced, resilient members disposed within the annular space for structurally connecting said rings together, each of said resilient members being attached to said rings at spaced locations on the inner and outer rings so that the resilient members have intermediate unattached portions extending circumferentially in the annular space between said rings, each of said resilient members having a height dimension extending in a radial direction, and a width dimension extending in a circumferential direction, the height dimension of each of said resilient members being substantially greater than the width dimension.

2. The mounting ring recited in claim 1 in which the intermediate unattached portions of the resilient members have a folded configuration within the annular space, the intermediate unattached portions forming beam structures that are rigid in a radial direction and resilient in a torsional direction.

3. The mounting ring recited in claim 1 in which each of the resilient members have end portions integrally attached to the inner ring and an intermediate portion integrally attached to the outer ring.

4. The mounting ring recited in claim 1 in which the inner ring has straight wall portions with any adjacent two wall portions forming corner junctions therebetween, the resilient members being attached to said straight wall portions adjacent said junctions.

5. The mounting ring recited in claim 1 in which the straight wall portions form a hexagon configuration.

6. The mounting ring recited in claim 1 in which the resilient members are provided with projections extending outwardly in the direction of the outer ring, and the outer ring is provided with projections extending inwardly in the direction of the inner ring and adjacent the projections provided on the resilient members, said outwardly and inwardly extending projections cooperating to form stop means for protecting the resilient members from excessive torsional stress.

7. The mounting ring recited in claim 1 in which the outer ring is provided with a gap structure including a hinged portion disposed at the inner end of the gap.

8. The mounting ring recited in claim 1 in which the outside surface of the outer ring is provided with axially spaced and circumferentially interrupted raised portions which form a central, peripheral groove in the outer ring.

References Cited

UNITED STATES PATENTS

| | | | |
|---|---|---|---|
| 2,251,398 | 8/1941 | Clark | 248—26 |
| 2,885,142 | 5/1959 | Eberhart | 248—15 XR |
| 2,936,141 | 5/1960 | Rapata | 248—26 |
| 3,065,941 | 11/1962 | Loftis | 248—26 |

JOHN PETO, *Primary Examiner.*